(12) United States Patent
Ricard et al.

(10) Patent No.: US 11,061,875 B2
(45) Date of Patent: Jul. 13, 2021

(54) CONCURRENT AUTHORING IN SEMANTIC LAYER UNIVERSES

(71) Applicant: SAP SE, Walldorf (DE)

(72) Inventors: Christophe Ricard, L'Hay-les-Roses (FR); Naeem Asghar, London (GB)

(73) Assignee: SAP SE, Walldorf (DE)

( * ) Notice: Subject to any disclaimer, the term of this patent is extended or adjusted under 35 U.S.C. 154(b) by 159 days.

(21) Appl. No.: 16/143,946

(22) Filed: Sep. 27, 2018

(65) Prior Publication Data

US 2020/0104283 A1  Apr. 2, 2020

(51) Int. Cl.
*G06F 16/21* (2019.01)
*G06F 16/23* (2019.01)
*G06F 16/25* (2019.01)

(52) U.S. Cl.
CPC ........ *G06F 16/219* (2019.01); *G06F 16/2329* (2019.01); *G06F 16/2358* (2019.01); *G06F 16/2365* (2019.01); *G06F 16/2379* (2019.01); *G06F 16/252* (2019.01)

(58) Field of Classification Search
CPC .. G06F 16/219; G06F 16/2329; G06F 16/252; G06F 16/2365; G06F 16/2358; G06F 16/2379
See application file for complete search history.

(56) References Cited

U.S. PATENT DOCUMENTS

| | | | |
|---|---|---|---|
| 9,235,409 B1* | 1/2016 | Guo | G06F 8/65 |
| 2013/0041915 A1* | 2/2013 | Meiniel | G06F 16/9535 707/769 |
| 2015/0025925 A1* | 1/2015 | Moore | G06Q 10/063 705/7.11 |
| 2017/0168801 A1* | 6/2017 | Eberlein | G06F 8/71 |
| 2017/0286456 A1* | 10/2017 | Wenzel | G06F 16/212 |

* cited by examiner

*Primary Examiner* — Hosain T Alam
*Assistant Examiner* — Chongsuh Park
(74) *Attorney, Agent, or Firm* — Buckley, Maschoff & Talwalkar LLC

(57) ABSTRACT

A system and method including authoring a semantic layer universe and at least one semantic layer set container created on top of the objects of the semantic layer universe and concurrently authoring of resources to the universe by one or more users based on a merge strategy based on at least a status of the resource being authored relative to the published universe.

18 Claims, 16 Drawing Sheets

600

```
if the version of the remote repository resource is the same as the version of the local repository resource {
    means no other user published before me
    a) increment the version of those specific resource contents having changed locally (compared to their
reference) and update
        said reference
    b) publish back the local resource as a whole (incrementing its overall version in the process)
}
else {
    means at least another user published before me
    for each local resource content subject to authoring {
        a) determine its status according to the remote resource
        b) in case status is {
            - unchanged: keep remote content unchanged (e.g. do nothing)
            - new: add the new content to the remote resource as version 1
            - deleted: remove this content from the remote resource
            - modifiedLocally: update the remote content, its version and reference
            - modifiedBothLocallyAndRemotely: solve the conflict, then update
              the remote content, its version and reference
        }
        c) increment overall version of the remote repository resource
    }
}
```

```
if(remoteContainer.getVersion() == localContainer.getVersion()) {
   for each(Definable d in localContainer) {
      if(d.getDefinition() != d.getReference()) {
         <d as Versionable>.setVersion(<d as Versionable>.getVersion() + 1);
         d.setReference(d.getDefinition());
      }
   }
   publish localContainer to remoteContainer;
   remoteContainer.setVersion(remoteContainer.getVersion() + 1);
}
```

```
if(remoteContainer.getVersion() > localContainer.getVersion()) {
    for each(Definable localDefinable in localContainer) {           ◄────805
        Definable remoteDefinable = remoteContainer.find(<localDefinable as Identifiable>.getIdentifier());
        switch(compare(localDefinable, remoteDefinable)) {
            case unchanged:                                            ┌─ 810
                loop to next for                                       ▼
            case new:
                remoteDefinable = remoteContainer.add(<localDefinable as Copiable>.copy());
                <remoteDefinable as Versionable>.setVersion(1);
                remoteDefinable.setReference(remoteDefinable.getDefinition());
            case deleted:
                remoteContainer.remove(remoteDefinable);
            case modifiedLocally:
                <localDefinable as Copiable>.copyTo(remoteDefinable);
                <remoteDefinable as Versionable>.setVersion(<remoteDefinable as Versionable>.getVersion() + 1);
                remoteDefinable.setReference(remoteDefinable.getDefinition());
            case modifiedBothLocallyAndRemotely:                       815
                if(AskUser() == <KeepLocal>) {                         ◄─┘
                    <localDefinable as Copiable>.copyTo(remoteDefinable);
                    <remoteDefinable as Versionable>.setVersion(<remoteDefinable as Versionable>.getVersion() + 1);
                    remoteDefinable.setReference(remoteDefinable.getDefinition());
                }
                else
                    loop to next for
        }
    }
    remoteContainer.setVersion(remoteContainer.getVersion() + 1);
}
```

CONCURRENT AUTHORING IN SEMANTIC LAYER UNIVERSES

BACKGROUND

Enterprise software systems receive, generate, and store data related to many aspects of a business enterprise. This data may relate to sales, customer relationships, marketing, supplier relationships, inventory, human resources, finances, and/or any other functions and processes of the organization. Users may operate querying and reporting tools to access such data and display the data in useful formats, such as graphic visualizations, reports, and other analytical outputs.

In some environments, a semantic layer universe may reside between an enterprise's data (e.g., a database) and the end users (e.g., customers). In some aspects, the semantic layer universe can include representations of the enterprise's data warehouse, including representations of real-world entities and processes. In some cases, the semantic layer universe might provide a mechanism to securely share the enterprise's data through a connection to one or more different querying clients. The semantic layer universe can be a valuable asset of the enterprise that can be used to generate insights into the operations of the enterprise. As such, constant maintenance of the integrity of the semantic layer universe may be vital to the enterprise. However, one or more users may have a desire to change some of the resources of the semantic layer universe.

BRIEF DESCRIPTION OF THE DRAWINGS

FIG. 6 is an example of illustrative instructions for a diff/merge strategy;

FIG. 7 is an example of illustrative instructions for a diff/merge strategy including changes by one user;

FIG. 8 is an example of illustrative instructions for a diff/merge strategy including changes by multiple users;

DETAILED DESCRIPTION

Figure 1:
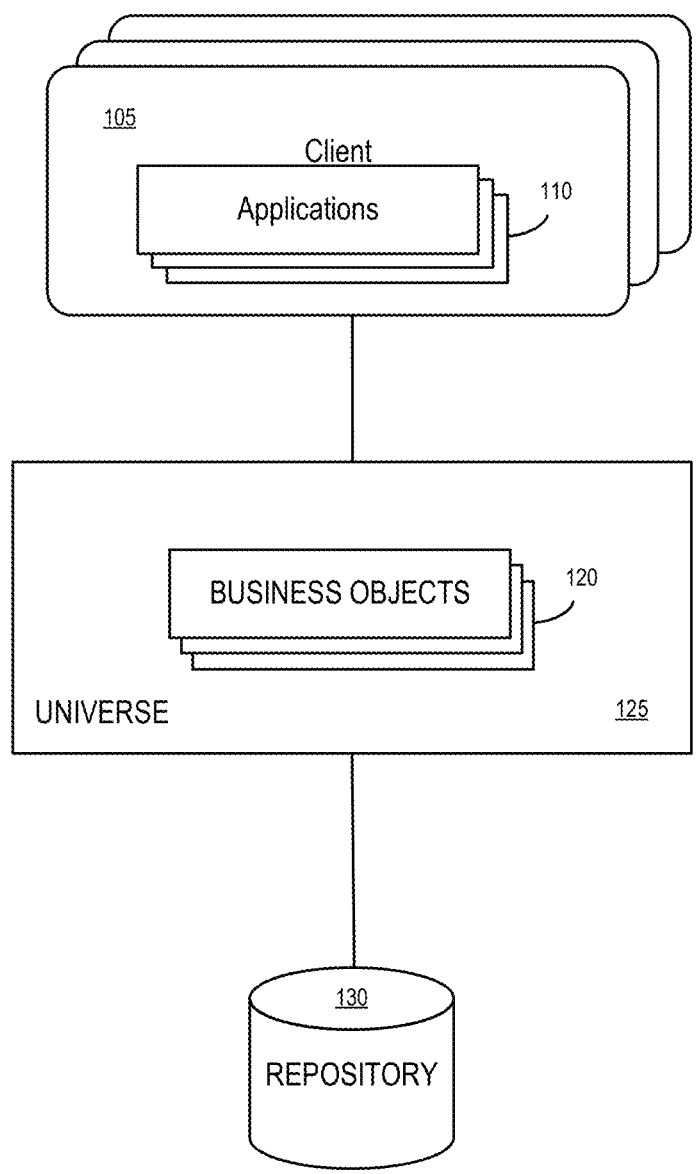
FIG. 1 is an illustrative schematic diagram of a system.

The following description is provided to enable any person in the art to make and use the described embodiments. Various modifications, however, will remain readily apparent to those in the art.

In some example contexts, use-cases, and embodiments, one or more terms will be used in the present disclosure. As a matter of introduction and to ease the understanding of the present disclosure, a number of terms will be introduced, where the full meaning of the following terms will be further understood in context of the disclosure herein, on the whole.

As used herein, a "Business Object" (BO) or simply "object" represents an aspect or feature of a real-world entity (e.g., company, person, product, process, a key performance index (KPI) for an area of an organization or business, etc.) and is mapped to specific data structures (e.g., table columns) in an underlying data source such as a database. A BO is a semantic entity, such as "Year", "Region", "Product", "Customer", etc. that represents a logical way of categorizing and grouping data for meaningful analysis of a business area or activity. A BO data structure can include fields with attributes and metadata associated with and defining the attribute fields. In some aspects, the BO refers to the specific collection of data according to the data structure (i.e., an instance of the BO data structure) that is stored in the database.

A "repository" herein may refer to a database used to store enterprise (i.e., organizational) platform information, such as user, server, folder, document, configuration, and authentication details.

A Semantic Layer (SL) herein refers to a representation of an organization's data that facilitates end users accessing the data autonomously using, for example, common understandable terms. A semantic layer may map complex data to familiar terms such as, for example, "product", "customer", or "revenue" in an effort to offer a unified, consolidated view of data across the organization that users can access without having a need to know the intricacies and complexities of the database, including its schema. The data and metadata (that is, objects) that comprise the semantic layer may be retrieved from a database and form a "semantic layer universe". As used herein, a semantic layer universe (also referred to simply as a "universe" and "UNX") is an abstraction of a data source that maps complex data into descriptive terms used across the organization. Some examples include, "Product," "Customer," "Region," "Revenue," "Margin", and "Costs". The universe resides between an organization's database(s) (or other data sources) and end-users such as customers, and isolates the end users from the technical details of the database(s) where source data is stored. Consistent with other terms herein, semantic universes include objects that are grouped into classes (and subclasses) that are mapped to the source data in the database and may be accessed through queries and reports. A "universe editor" refers to a dedicated User Interface (UI) that provides a mechanism to allow a specific role among users (e.g., universe designers) to design and publish universes to a repository.

As used herein, a "set" refers to a semantic entity defining one or more steps to execute (i.e., a method) to produce, for example, a list of unique and homogeneous data-mart identifiers (Customer IDs, Product IDs, Transaction IDs, etc.). A set may include many steps, including steps having dependencies on other steps. A set is created on top of BOs, including the data (e.g., fields and attributes) and metadata associated therewith. A set may include other aspects or features, in addition to the one or more BOs on which it is created or based. A "set container" refers to a structure hosting a number of sets, possibly among other entities, for performance and administrative purposes. A "set designer" refers to a role aimed at designing and publishing sets and a "sets editor" refers to a dedicated UI that allows set designers to design Sets.

As used herein, "authoring" herein refers to the action of editing metadata exposed by the sematic layer. Instances of multiple users performing editing action(s) on the same metadata at the same time constitutes "concurrent authoring". The action of broadcasting a user's authoring work to the entire enterprise (i.e., universe) where it can be shared by others is referred to herein as publishing.

A "query" may be used to retrieve a collection of BOs (i.e., "objects") based on specific criteria. In some embodiments, an inquiry or query is converted by an application, service, or server (e.g. a BusinessObjects server) to SQL or other language statements appropriate to query a database. The SQL (or other language) query is sent to the database to retrieve the data mapped to the objects referenced and relevant to the query. A collection of criteria that restricts the type and/or number of records returned as a query result is referred to as a "filter". In some aspects, a filter defines a sub-set of data to appear in a query's result list. Some embodiments herein may include a "query panel" (QP), where a QP refers to a UI, possibly dedicated, that provides a mechanism to allow end users to define queries. The QP may also present a view of the Universe to the end user.

FIG. 1 is an illustrative block diagram of an architecture or system 100, in one example. Examples of some embodiments of the present disclosure are not limited to the particular architecture 100 shown in FIG. 1. System 100 includes one or more client devices 105 running one or more applications 110. Applications 110 may, in some embodiments, include a suite of different software applications having, at least to some extent, related functionality, similar user interfaces, and some ability to exchange data with each other. Applications 110 may include different software applications that support the operations and process of an organization.

System 100 includes a semantic layer universe 125 comprising a plurality of business objects (BOs) 120. Universe 125 is logically located between an enterprise's or organization's source of data stored on (remote) repository 130 (e.g., an in-memory database) and a consumption level including clients 105 where users can invoke an execution of queries via, for example, user interfaces, UIs, (not shown in FIG. 1) of the applications 110 executing, at least in part, on the clients.

Universe 125 is an abstraction of data source 130 that maps complex data into descriptive terms used across the organization. Some example terms include "Revenue", "Margin", and "Costs". Universe 125 is separate and distinct from the repository 130. Universe 125 includes objects (e.g., "Product", "Customer", and "Region") that are grouped into classes and mapped to the data in the repository 130. The data in repository 130 may be accessed using, for example, plain language names, through queries from applications 110. Universe 125 may be created or authored by a "universe editor" (not shown). The universe editor may include a UI that provides a mechanism for a user to design universes using, for example, drag-and-drop techniques to interact with graphical representations thereon.

In some aspects, a universe administrator or other authorized entity in defining a universe may consider and attempt to anticipate what data features, access, and relationships end users/consumers may want and need. After defining the objects and constraints of a universe, the universe administrator may author and publish the universe so the end users can see, access, and use it to interact with the database supporting the universe.

In some aspects, universe 125 may be used by the different applications 110, where applications 110 may correspond to different applications or services offered by a software provider. As such, the data representations of universe 125 may be a valuable asset and aspect to the on-going functionality of an associated organization, including objects representing operational and analytical processes of the organization.

In some aspects, it can be vital that the integrity and accuracy of universe 125 be maintained. In some embodiments, universe 125 may be read-only by users, thereby preventing users from changing data that might be critical or relevant to an enterprise and parts thereof. Universe 125 may however be modified by an entity having a sufficient security clearance to making changes thereto such as a universe editor (not shown) and a set designer. In some embodiments or contexts, a universe may be periodically updated or otherwise modified to reflect changes to the organization and/or its processes and methods of operation by multiple authors (e.g., set designers) working to simultaneously publish their changes (i.e., work) to the repository.

In one example, a client 105 executes an application 110 to present a query panel (QP) via a user interface (UI) to a user on a display of client 105. The user manipulates UI elements within the UI to indicate a query by selecting one or more graphical representations of BOs, where a server or service embodying universe 125 operates to generate one or more SQL statements that are sent to repository 130. Repository 130 may execute instructions corresponding to the SQL statements to generate query results (i.e., data mapped to the objects selected by the user). The query results may be presented to the user in a view including, for example, a report, a dashboard, or other record.

Repository 130 may comprise any data source or sources that are or become known. Repository 130 may comprise a relational database, a HTML document, an eXtendable Markup Language (XML) document, or any other data storage system storing structured and/or unstructured data files. The data of data repository 130 may be distributed among several data sources. Embodiments are not limited to any number or types of data sources.

Repository 130 may implement an "in-memory" database, where a full database is stored in volatile (e.g., non-disk-based) memory (e.g., Random Access Memory). The full database may be persisted in and/or backed up to fixed disks (not shown). Embodiments herein are not limited to an in-memory implementation. For example, data may be stored in Random Access Memory (e.g., cache memory for storing recently-used data) and other forms of solid state memory and/or one or more fixed disks (e.g., persistent memory for storing their respective portions of the full database).

Figure 2:
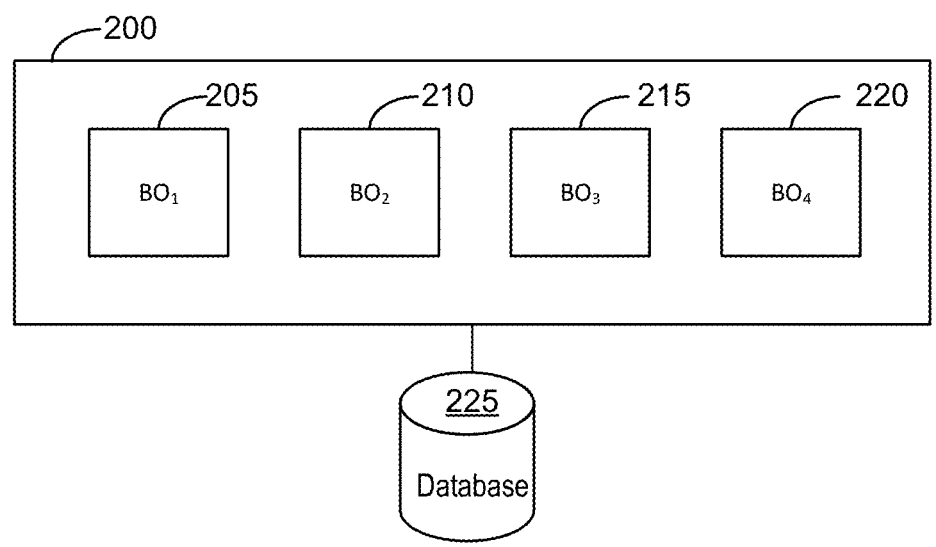
FIG. 2 is an example schematic embodiment of a semantic layer universe.

FIG. 2 is an illustrative depiction of a semantic layer universe 200. Universe 200 may be created (i.e., authored) by a universe designer or other authorized entity via a universe editor UI tool, feature, application, or service. Universe 200 includes, by way of example, BOs 205, 210, 215, and 220. Each of the BOs in universe 200 are representations of model-based data structures having fields and attributes, where each BO is defined by metadata associated therewith. Universe 200 is a metadata semantic layer and does not itself contain data. The data corresponding to the BO representations in the semantic layer universe 200 is stored in a database (e.g., FIG. 1, 130) or other data store. Reference numeral 225 refers to a database, database management system, an instance of a database node, or other data source storing the data mapped to BOs 205, 210, 215, and 220. FIG. 2 is a simplified example of a universe and specific implementations of a universe may include thousands of BOs representing different aspects of an enterprise.

In some contexts, a user or other entity may want to enrich an existing or new universe (e.g., 125) to include innovations such as, for example, additional or different methods and data representations and relationships not offered by an organizations' semantic layer universe. In some example embodiments, the innovations may occur rather frequently as compared to the lifecycle of the universe and may further relate to a specific subset of applications 110 and/or users thereof. In some aspects, a "set" may be created by a user (e.g., a set designer working to implement desires of end users) to define a method to produce, for example, a list of unique and homogeneous data-mart identifiers (Customer IDs, Product IDs, Transaction IDs, etc.). The set is created on top of the BOs of universe 125, where the set is also a semantic entity and includes at least some aspects (e.g., fields, attributes, methods, and metadata) of the objects of the universe. A set herein may include other aspects or features, in addition to the one or more BOs (or parts thereof) on which it is created or based. In some aspects, the set may be updated or created on a daily or even shorter timeframe.

Figure 3:
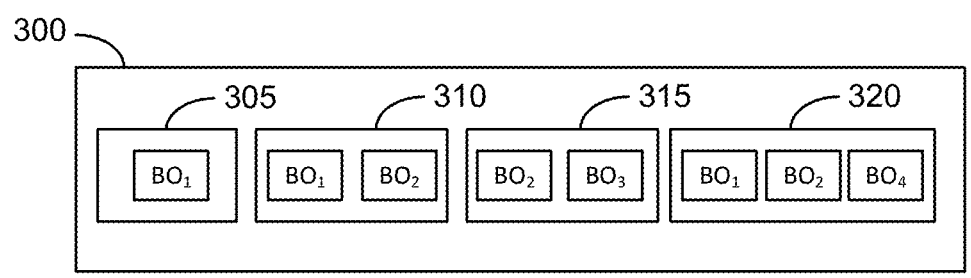
FIG. 3 is an example schematic embodiment of a semantic layer set.

FIG. 3 is an illustrative example of semantic layer sets or simply "sets". In the example of FIG. 3, the depicted sets include set 305, set 310, set 315 and set 320. Each set is defined and created on top of one of more objects (i.e., BOs) from the universe that it is associated with. The sets of FIG. 3 are associated with universe 200 of FIG. 2. As such, each set in FIG. 3 is created on top of or is based on one or more of the BOs of universe 200. As depicted in FIG. 3, set 305 is created on top of BO1 from universe 200; set 310 is created on top of BO1 and BO2 from universe 200; set 315 is created on top of BO2 and BO3 from universe 200; and set 320 is created on top of BO1, BO2, and BO4. As used herein, a set that is created on top of a BO means that the set includes at least some of the characteristics (e.g., fields, methods, and attributes) of the underlying BO, as well as the associated metadata of the BO. In some embodiments, the underlying BO may be unaltered, whereas the underlying BO may be altered in some embodiments (e.g., some attributes not used or changed). The sets in FIG. 3 are further shown as being grouped together by a set container 300. The example of FIG. 3 illustrates one set container including four sets. A universe may have multiple set containers linked or associated therewith, as defined by a repository relationship.

Figure 4:
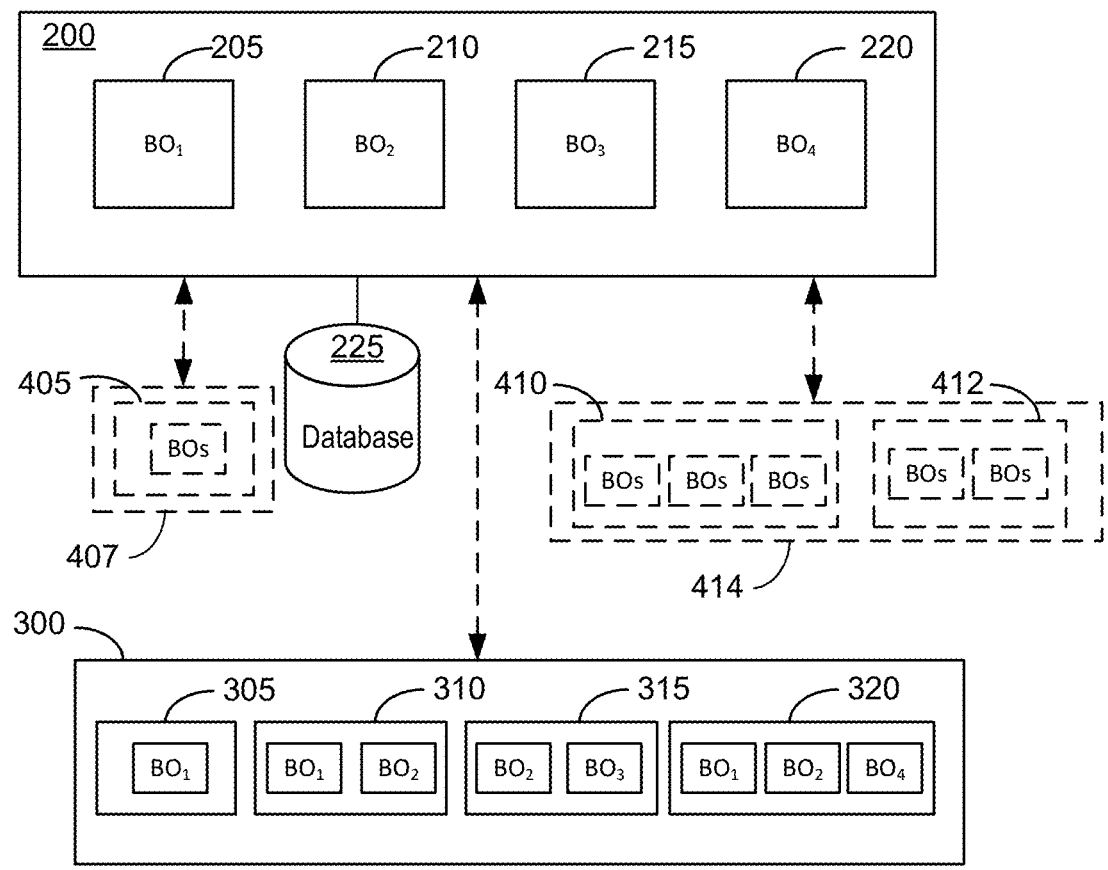
FIG. 4 is an example schematic embodiment of a consolidated semantic layer universe.

FIG. 4 is an illustrative depiction of a semantic layer universe 200 and the set container 300 being linked together by a repository relationship, as depicted by the dashed line arrow between the universe and set container 300 including sets 305, 310, 315, and 320. The repository relationship defines the connection or association between universe 200 and the sets 305, 310, 315, and 320 included in set container 300. FIG. 4 further illustrates that universe 200 may be linked to one or more set containers, each including one or more sets that in turn are created on top of one or more objects of the universe. As illustrated in FIG. 4, semantic layer universe 200 is further linked to set containers 407 and 414, where set container 414 includes sets 410 and 412 and set 405 is included in set container 407. In the example of FIG. 4, set containers 407 and 414 and the contents therein are depicted as dashed lines to further indicate that these set containers are newly created extensions of semantic layer universe 200. In some instances, a universe may include, for example, upwards of hundreds of sets.

In some embodiments, systems and platforms support concurrent authoring of universes by multiple users. In the context of multiple different users (e.g., set designers) being permitted to publish to the repository, the last user delivering their work (e.g., changes) to the repository should not necessarily be able to simply overwrite the previously submitted metadata of other users. Accordingly, some aspects and embodiments herein include technical details and specifications for an intelligent publishing strategy, including for example, operations for automatically merging changes simultaneously made by different users to the contents of the same repository resource.

In some aspects, the present disclosure includes technical details for providing functionality for the same repository resource to be updated several times by different users, simultaneously or not, in such a collaborative manner that a system and process herein seamlessly merges amendments made by each contributor to its respective content(s). In some embodiments, a target architecture might ensure the following to achieve some of the foregoing. In particular, 1. The repository resource supports versioning;
2. The repository resource provides a mechanism to collect all of its specific contents that are subject to authoring;
3. The repository resource provides a mechanism to uniquely identify all the elements constituting its contents;
4. Specific contents of the resource subject to authoring provide a mechanism to depict themselves as "changed" compared to a reference; and
5. Specific contents of the resource subject to authoring support versioning.

In some embodiments, the preceding five criteria may be addressed by, for example, an architecture wherein (1) set containers support versioning, wherein they are stored as an InfoObject on the repository; (2) set containers are capable of iterating through all of their contents; during a publishing process, set containers are able to collect only those that implement a "Definable" interface, indicative that they can be authored by set designers; (4) Definable elements implement an existing interface Identifiable, which provides a getIdentifier( )method; (4) Definable elements can describe themselves in a text string via a getDefinition( )method. They also contain a reference member which captures the latest getDefinition( )at publishing time when authoring is complete. In some aspects, when a Definable element is edited, its definition evolves and differs from the unchanged reference. and (5) Definable elements also implement a new Versionable interface providing getVersion( )and setVersion( )methods, as well as a new Copiable interface defining copy( ) and copyTo(Copiable) methods.

As used herein, an InfoObject is a normalized type of entity hosted by the repository, generic in its principle but subject to specialization. An Interface refers to an abstract programming type that is used to specify a behavior that other programming types must implement. The term "Implementation" refers to the act of providing a practical/technical means for carrying into effect an abstract concept. A "method", in object-oriented programming, is an operation to be performed in a systematic way, which implies an orderly logical arrangement (usually, in steps) and a "member" variable (sometimes called a member field) is, in object-oriented programming, a variable that is associated with a specific object, and accessible for all its methods (member functions).

Figure 5:
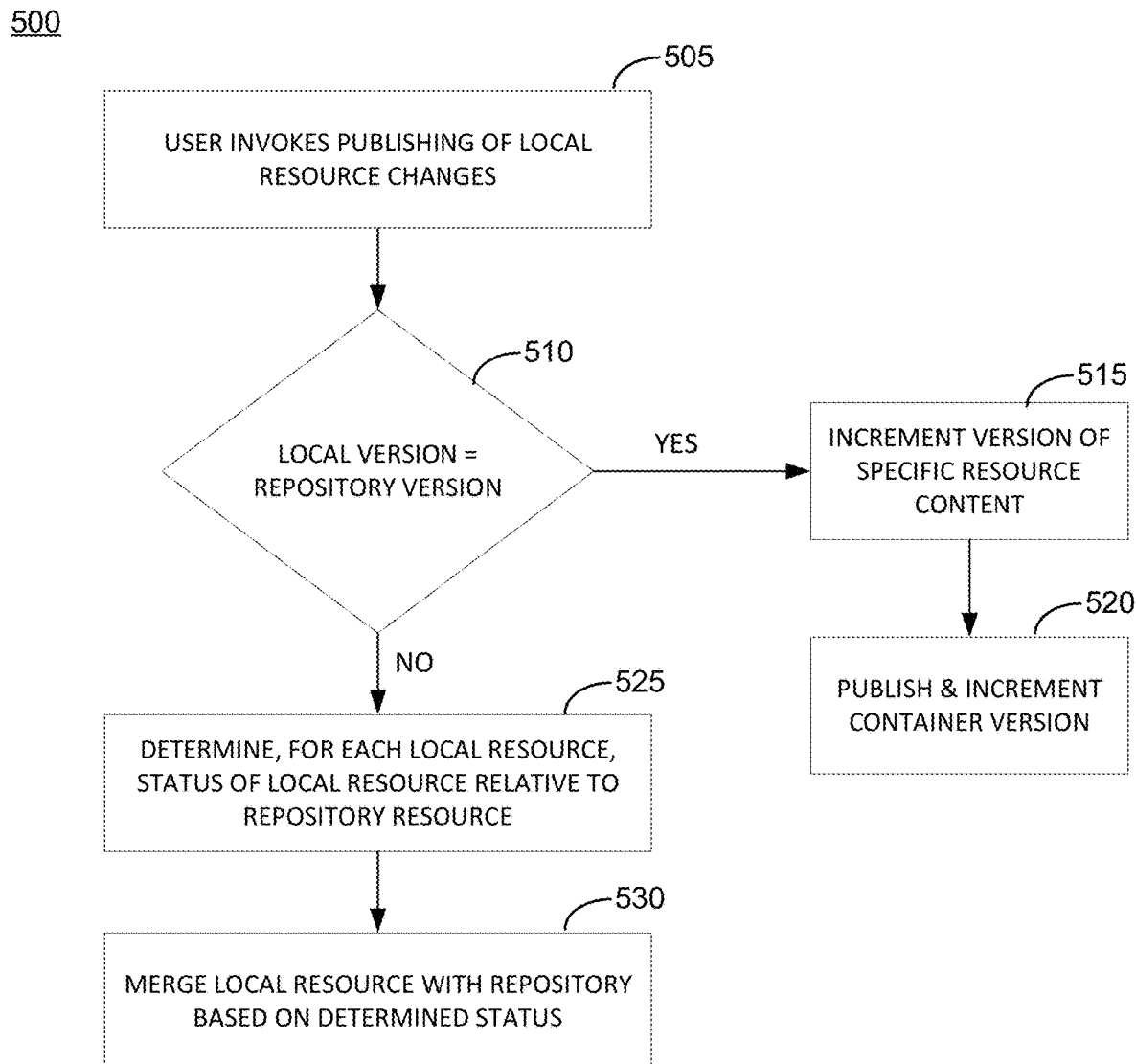
FIG. 5 is an example embodiment of an illustrative flow diagram of a process herein.

FIG. 5 is an illustrative flow diagram of a diff/merge process 500, according to some embodiments herein. Process 500 may be invoked or otherwise initiated in response to user publishing their local set container, thereby requesting their local set container be merged with the remote set container on the repository. At operation 505, a user invokes or otherwise commences a process to publish changes of their local resources. At operation 510, a determination is made regarding whether the versioning of the local set container is the same as the (remote) repository container. In the event the determination at operation 510 concludes the versions are the same, indicating no other users have published before the current user seeking to publish to the repository, process 500 advances to operation 515 where the version number of the specific resource being merged is incremented (i.e., to account for the change to the specific resource). Furthermore at operation 520, the local resource changes are published to the repository and the version number of the set container is incremented to account for the change therein.

In the event the determination at operation 510 concludes the versions are not the same, indicating that at least one other user has published to the repository before the current user seeking to publish to the repository, process 500 advances to operation 525. At operation 525, a determination is made, for each local resource, regarding the status of the local resource relative to the repository's version (i.e., reference) thereof. Different states for the local resource relative to the repository can include, for example, unchanged, new, deleted, modified locally, and modified both locally and remotely (i.e., on the repository). Depending on the particular status determined for each particular local resource at operation 525, each respective local resource can be merged with the (remote) repository at operation 530. It is noted that the status of each local resource to be merged is determined individually relative to the repository and merged based on its own determined state. In some aspects, the merge strategy for different local resource states differ from each other and may be defined to execute automatic merge strategies.

FIG. 6 is an illustrative depiction including a listing of instructions or (pseudo-) code 600 that may be used by a system, service, or platform to perform concurrent authoring using a diff/merge strategy, in some embodiments herein. In some aspects, a first portion 605 of instructions 600 corresponds to operations 510, 515, and 520 of FIG. 5 where the version of the remote repository resource is the same as the version of the local resource. A later portion of the instructions as shown at 610 may correspond to operations 510, 525, and 530 of FIG. 5 where the version of the remote repository resource is different from the version of the local resource and the particular merging function to be executed for each local resource relies on the determined status of each respective local resource.

FIG. 7 is an illustrative depiction including a listing of instructions or (pseudo-) code 700 that may be used by a system, service, or platform to perform concurrent authoring using a diff/merge strategy where the changes have been made by one, current user. In some aspects, the listing of instructions 700 includes determining whether the version of the local set container and remote repository set container are the same, indicating no changes by other users. Instruction listing 700 further includes, for each local resource in the local set container, incrementing the version of the respective resource and setting the definition of the resource in the remote repository to that of the local resource, as well as publishing the local set container to the remote set container and incrementing the versioning of the remote set container. In some aspects, the listing in FIG. 7 may represent aspects of operations 510, 515, and 520 of FIG. 5.

FIG. 8 is an illustrative depiction including a listing of instructions or (pseudo-) code 800 that may be used by a system, service, or platform to perform concurrent authoring using a diff/merge strategy where the changes have been made by more than one user. In some aspects, the listing of instructions 800 includes initially determining, as shown at 810, whether the version of the local set container is less than the version of the remote repository set container, indicating that at least one other user has published changes to the remote repository since the current user has synced with the remote repository. Further instructions in FIG. 8 include comparing each local resource with a corresponding remote repository resource to determine, relative to the remote repository, whether the local resource is unchanged (in which case no further action is needed); whether the local resource is new (in which case the local resource is added to the remote repository); whether the local resource is being deleted (in which case it is removed from the remote set container; whether the local resource is modified locally (in which case the definition for the remote resource is updated to that of the modified local resource and its versioning is incremented); and whether the both the local resource and the corresponding remote repository resource are modified (in which case the depicted diff/merge strategy solicits input from the user regarding whether the keep the local resource and to update the remote repository accordingly in light of the conflict, as well incrementing the versioning of the remote repository).

Figure 9A:
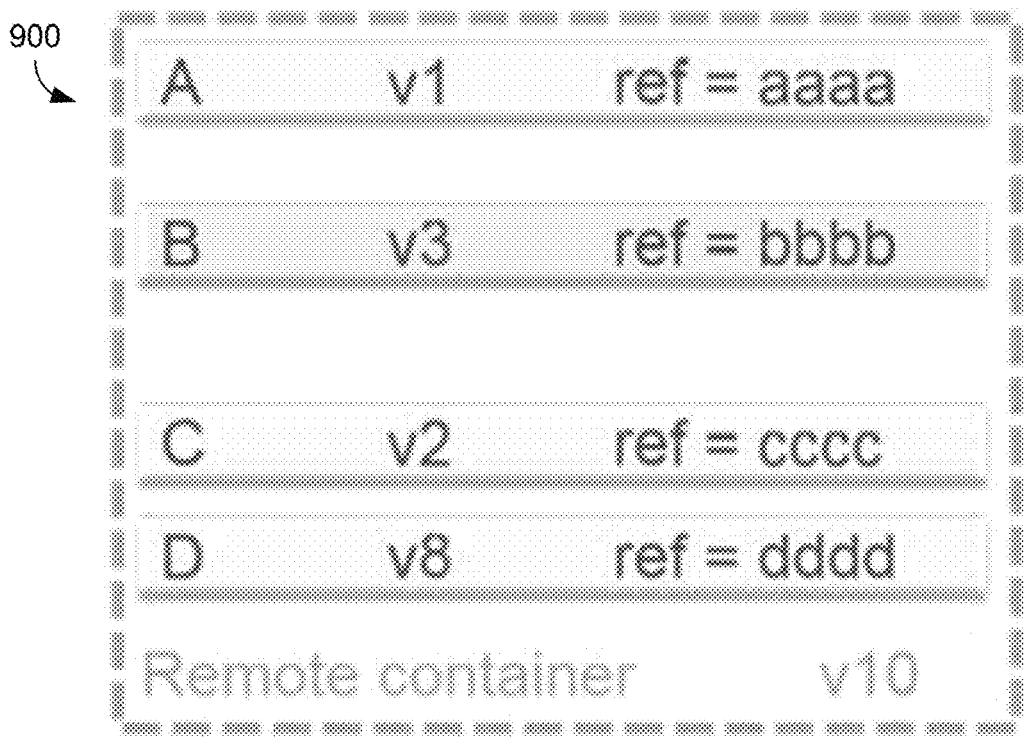
FIGS. 9A-9F illustrate aspects of concurrent authoring using a diff/merge strategy herein.
Figure 9B:
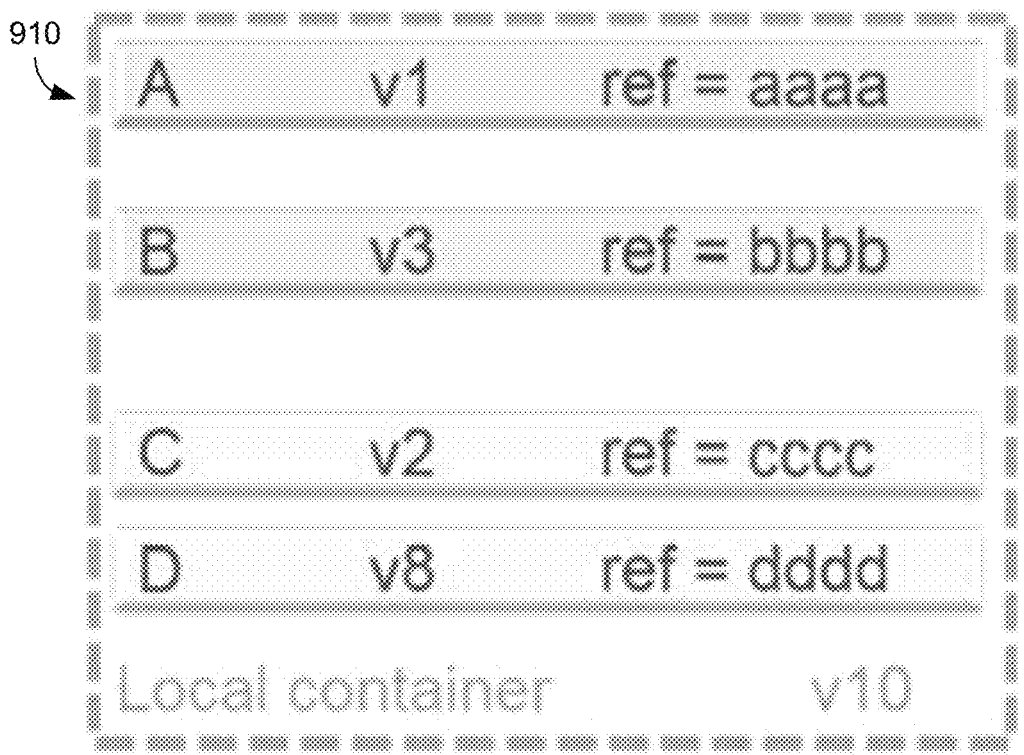

FIGS. 9A-9E illustrate aspects of concurrent authoring using a diff/merge strategy herein. FIGS. 9A-9E relate to an example set container already published on a remote repository (not shown in FIGS. 9A-9E). FIG. 9A is a depiction of a remote set container 900 (also referred to as a remote container) having a version number 10. FIG. 9B shows a first user having retrieved a copy 910 of remote container 900 into their local workspace in order to author the contents thereof. As shown, the first user's local copy is the same as remote container.

Figure 9C:
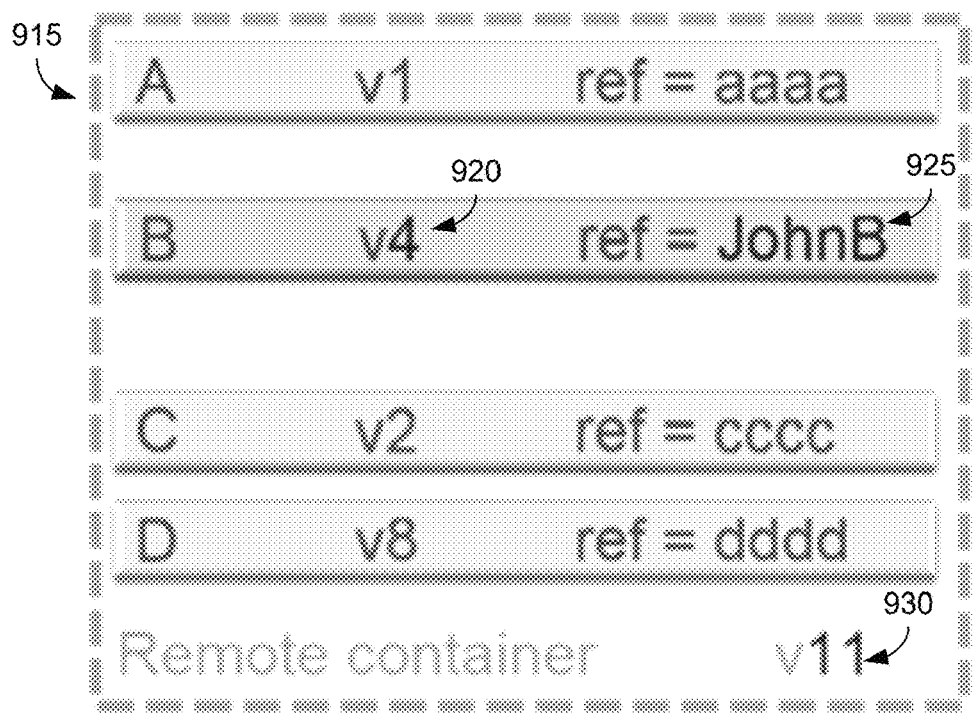

FIG. 9C shows changes published to the remote container (915) by a second user. As shown, the second user publishes changes to element B, where the version number becomes 4 (920), the contents reference of element B is changed (i.e., changed to "JohnB", 925), and the container version becomes 11 (930).

Figure 9D:
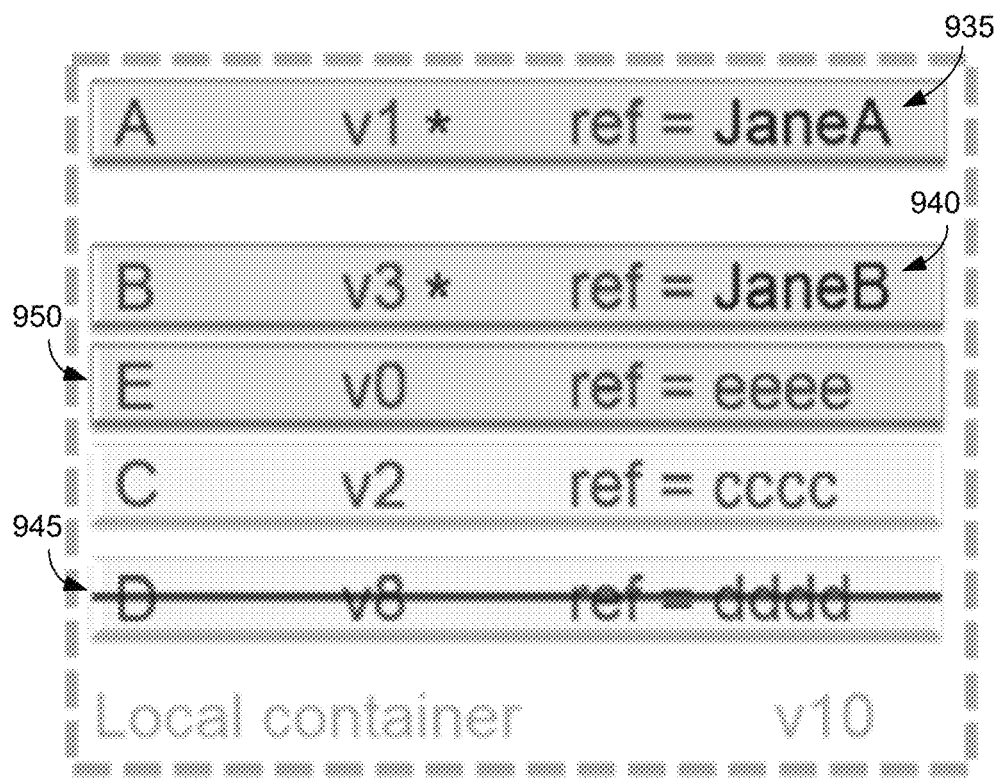

FIG. 9D shows changes made to the local version of the container by the first user. As shown, the first user updates element A (i.e., changed contents reference to JaneA, 935), updates element B (i.e., changed contents reference to JaneB, 940), deletes element D (945), and adds new element E (local version=0, 950).

Figure 9E:
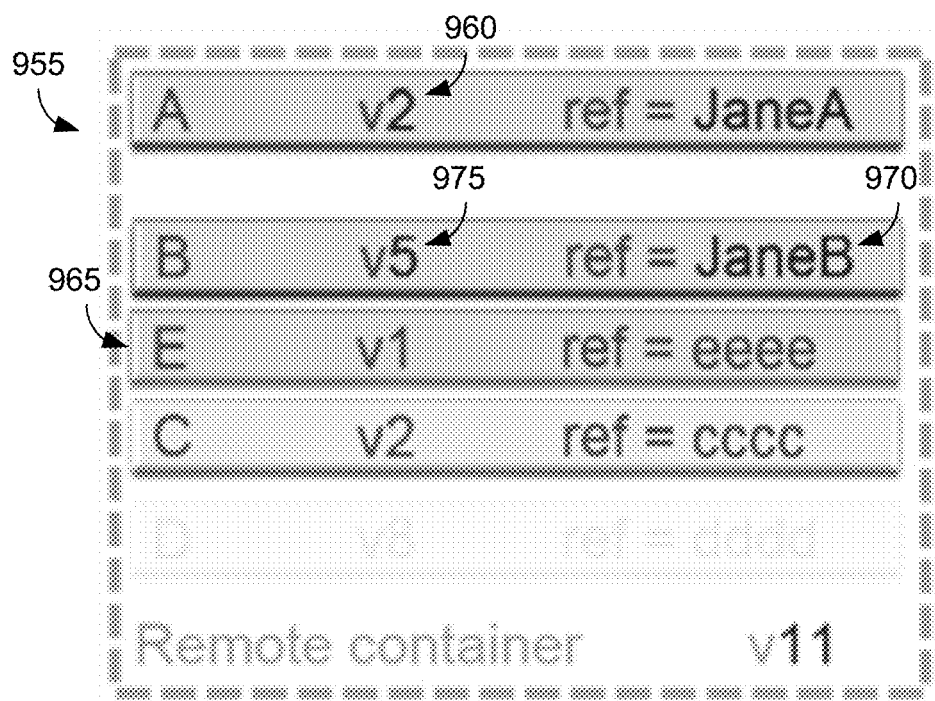

FIG. 9E illustrates the first user publishing their changes made locally back to the repository, resulting in container 955 on the repository. In accordance with aspects herein, a diff/merge strategy or mechanism herein is activated or otherwise invoked in response to the first user's action to publish their local container to the repository wherein the version of the local resource container (i.e., v10 per FIG. 9D) and the remote repository container (i.e., v11 per FIG. 9C) are different from each other. Container 955 is the result of the first user's local container including their changes (i.e., 9D) merging with the remote container (i.e., FIG. 9C), wherein element A is automatically pushed to v2 (960) because the remote container's version is unchanged, element E is automatically added to the remote container (965) as v1 since it is new, and element D is automatically deleted. However, there is a conflict regarding element B since both the version number of the local container (FIG. 9D, v10) and the remote container (FIG. 9C, v11) are different and the local version number for the resource element B is lower than (v3) the version number of the remote repository resource (v4). According the some embodiments, input is solicited from the first user and in the present example, the first user provided an indication that they wanted to keep their changes (i.e., discard the changes made by other users). Therefore, reference contents for element B is updated to JaneB (970) and the version number for element B is updated to v5 (975).

Figure 9F:
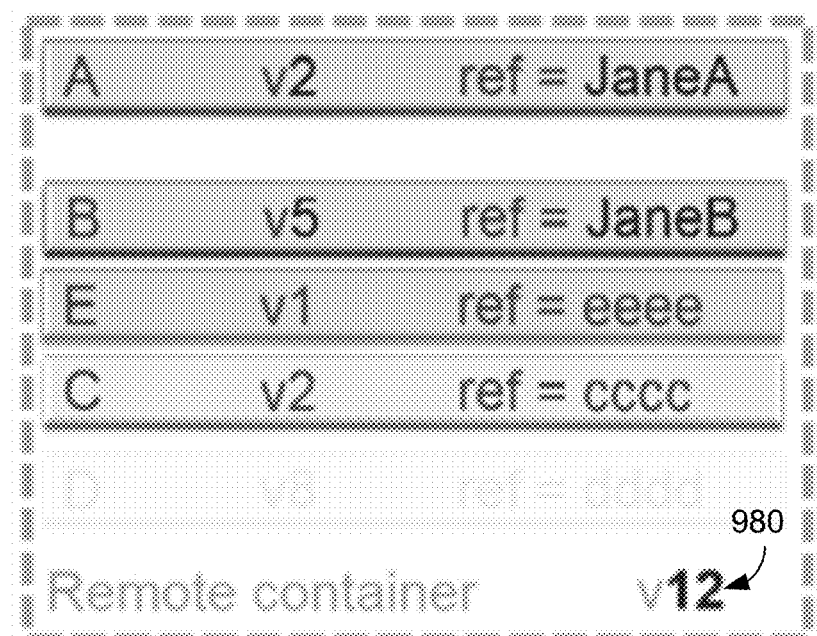

FIG. 9F shows the overall version of the remote container being automatically incremented to 12 (980), after all of the changes have been performed to publish the first user's changes to the remote repository.

Figure 10:
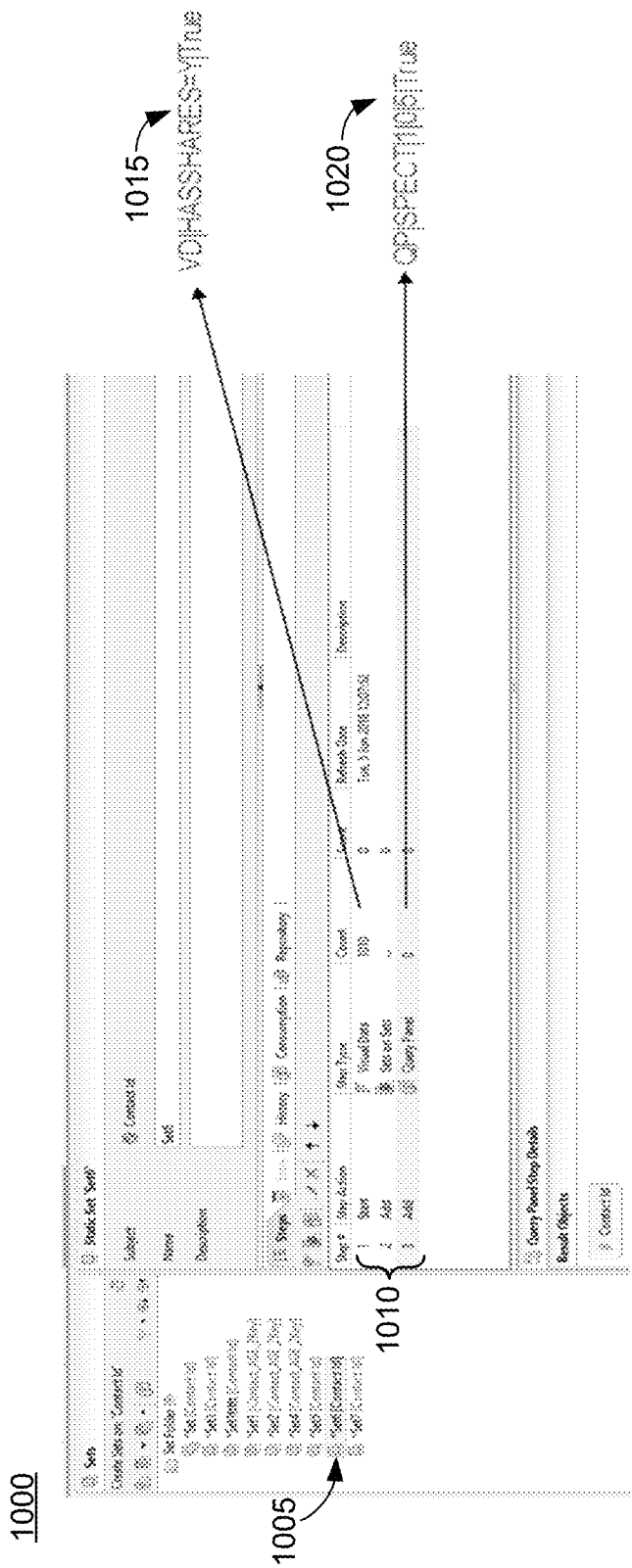
FIG. 10 is an illustrative example of a user interface depicting aspects of resource signatures, in some embodiments herein.

In some aspects and embodiments herein, each component (i.e., resource) of a set may be configured or defined to describe itself. Each description for a component comprising a set may be represented by a unique string. A combination of the string values representing all of the components of a set may fully describe the set. In this manner, the string values of different sets may be compared to determine whether any differences exist between the subject sets. FIG. 10 is an illustrative example of a user interface 1000 depicting aspects of resource signatures, in some embodiments herein. Set_6 is shown highlighted at 1005. Furthermore, Set_6 is shown as including 3 steps at 1010. In the present example, each step browses itself to determine how it is defined and returns a string description that is unique to that definition. As illustrated, step 1 returns the string depicted at 1015 and step 2 returns the value shown at 1020. The strings corresponding to the steps of Set_6 may be strung/appended together to obtain a "signature" for the set.

Once a signature for a set is determined or otherwise obtained, the signature may be compared to a saved signature corresponding to a time when the set was previously published. That is, set signatures can be determined when a set is published. In this manner, two signatures can be compared to determine what particular differences exist between the two versions of the set, as represented by the set signatures.

In some aspects, set signatures herein can comprise strings representing steps and different objects and components comprising the steps. Based the strings corresponding to steps and components thereof, specific details can be compared. In some embodiments, specific portions of steps may be compared and replaced, as opposed to an entire set being replaced based on some change(s) somewhere in the set. For example, instead of replacing step A with step B, some embodiments may replace a portion of step A with a specific portion of step B, wherein only the specific portions/aspects changed need be replaced. In some aspects, set signatures provide a mechanism to compare and author changes with a greater technical preciseness.

As demonstrated in the examples above, when a user publishes their local set container to a repository, the set container is merged with the remote set container on the repository wherein local changes are combined with the remote repository container. In many (i.e., most) cases, the merging of the local set container with the remote container can be accomplished automatically based on the status of the set container to be merged (i.e., auto-resolved).

However, in some instances and scenarios, a conflict or ambiguity might arise when set container(s) are being published. The conflict might occur due to mismatches in the versions of a local set container and a (remote) repository set container and the resources (e.g., step(s)) within the set container. Due to differences in versions, it may be ambiguous or otherwise unclear as to which set container should be published in one or more scenarios.

FIGS. 11-14 herein illustrate different scenarios or use-cases where a conflict might arise, wherein the conflict might necessitate user input or auto-resolve. For each of the four example scenarios depicted, one unique set container is already published on the remote repository with an initial revision number of #n and there are two (2) different users working on the container at the same time (e.g., Admin and User1).

In some embodiments, a conflict occurs when a resource is tagged or otherwise identified as being "dirty locally". Being dirty locally means (1) the resource has been modified since its last synchronization with the (remote) repository and (2) its local revision number is lower that the remote revision number. If these two conditions are met, then the user publishing the resource may be prompted or solicited for input regarding handling of the encountered conflict.

Figure 11A:
FIGS. 11A-11E illustrate aspects of a conflict management process for moving a modified resource using a diff/merge strategy herein.
Figure 11B:
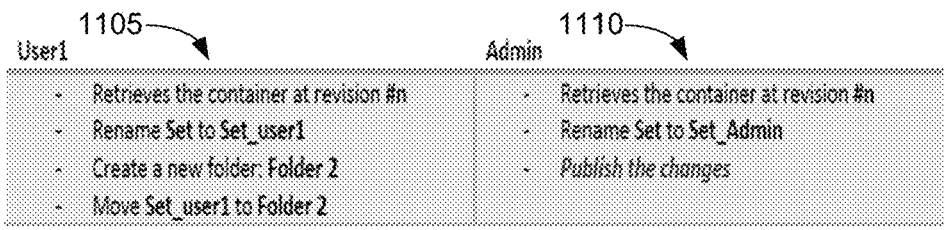
Figure 11C:
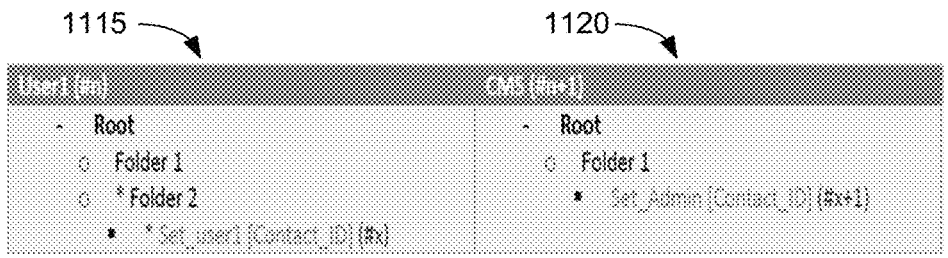

FIGS. 11A-11E illustrate aspects of a conflict management process for moving a modified resource using a diff/merge strategy herein. In particular, FIG. 11A shows an initial state of a repository, including a container 1100 with an initial revision number of #n. FIG. 11B illustrates actions 1105 and 1110 performed simultaneously by User1 and Admin, respectively. Based on the actions simultaneously performed by the users User1 and Admin, the resulting local resource is depicted at 1115 and the resulting resource on the repository due the Admin's actions are shown at 1120. As shown, the version number for modified resource 1115 remains #n since it has not yet been synced and the Folder 2 and Set_user1 therein are marked dirty locally as indicated by the "*" before each (although other indicators/flags may be used). Meanwhile, the revision number for container 1120 on the repository has been incremented since it has been published per the Admin's actions listed in FIG. 11B. Also, the revision number for the renamed (i.e., changed) set "Set-Admin [Contact_ID]" has also been incremented since it too was published.

Subsequent to the two users' simultaneous actions of FIG. 11B, User1 proceeds to publish his changes to the remote repository. However, a conflict is encountered on "Set_user1 [Contact_ID]". As shown, the revision number of the containers 1115 and 1120 are different and the revision number for the local resource "Set_user1 [Contact_ID]" is lower than the repository's corresponding resource. Due to the conflict, User1 is prompted to indicate whether they want to keep the conflicted resource on the repository (i.e., discard their own changes) or replace the conflicted resource on the repository (i.e., keep their changes).

Figure 11D:
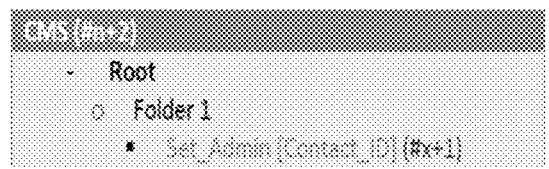
Figure 11E:
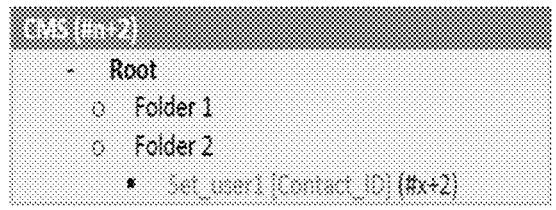

FIG. 11D shows the merged result when User1 opts to keep the resource previously published on the repository. As shown, the revision number for the merged container is incremented to account for the new publication. FIG. 11E shows the merged result when User1 opts to keep their changed resource. As shown, the revision number for the merged container is incremented to account for the new publication and the revision number for resource "Set_user1 [Contact_ID]" is also incremented to uniquely identify the newly published version thereof.

Figure 12A:
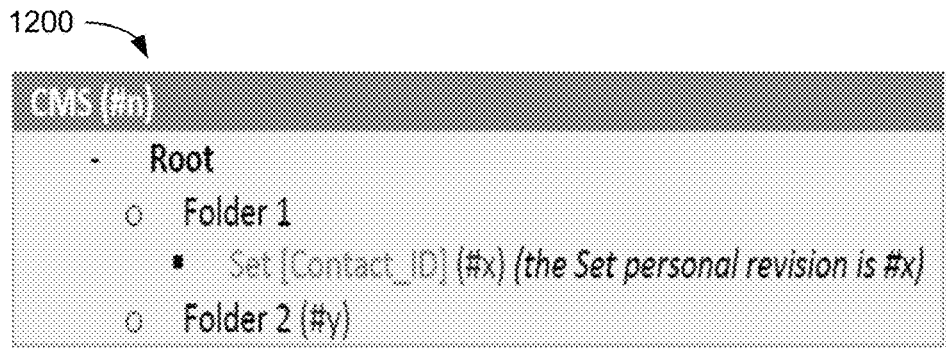
FIGS. 12A-12E illustrate aspects of a conflict management process for moving a resource to a missing folder using a diff/merge strategy herein.
Figure 12B:
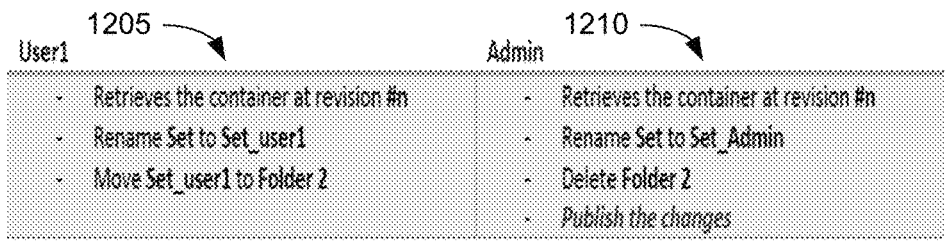
Figure 12C:
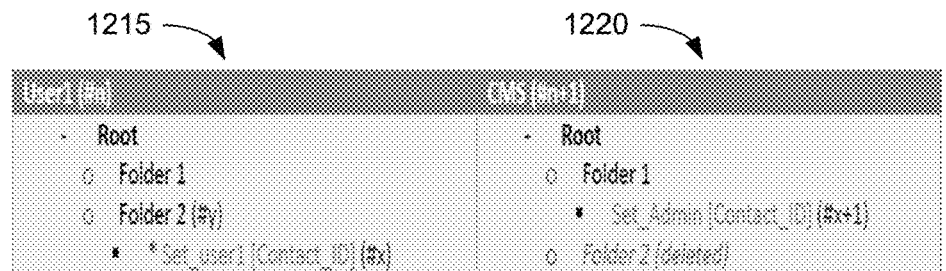

FIGS. 12A-12E illustrate aspects of a conflict management process for moving a resource to a missing folder using a diff/merge strategy herein. In particular, FIG. 12A shows an initial state of a repository, including a container 1200 with an initial revision number of #n. FIG. 12B illustrates actions 1205 and 1210 performed simultaneously by User1 and Admin, respectively. The actions include User1 moving resource "Set_user1" to "Folder 2". Based on the actions simultaneously performed by the users User1 and Admin, the resulting local resource is depicted at 1215 and the resulting resource on the repository due the Admin's actions are shown at 1220. The version number for modified local resource 1215 remains #n since it has not yet been synced to the repository and "Set_user1 [Contact_ID]" therein is marked dirty as indicated by the "*". Also, the revision number for container 1220 on the repository has been incremented since it has been published per the Admin's actions listed in FIG. 12B and the revision number for the renamed (i.e., changed) set "Set-Admin [Contact_ID]" has been incremented since it was published.

After the two users' simultaneous actions of FIG. 12B, User1 proceeds to publish his changes to the remote repository. However, a conflict is encountered on "Set_user1 [Contact_ID]". As shown, the revision number of the containers 1215 and 1220 are different and the revision number for the local resource "Set_user1 [Contact_ID]" is lower than the repository's corresponding resource. Due to the conflict, User1 is prompted to indicate whether they want to keep the conflicted resource on the repository (i.e., discard their own changes) or replace the conflicted resource on the repository (i.e., keep their changes). This prompting and/or solicitation of input from the user may be accomplished via one or more user interfaces generated and presented to the user User1.

Figure 12D:
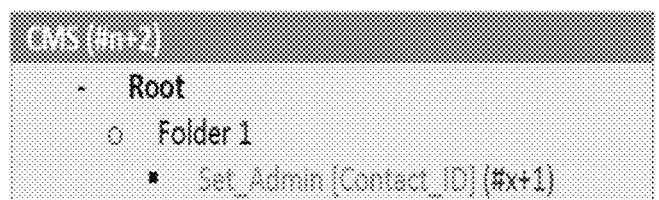
Figure 12E:
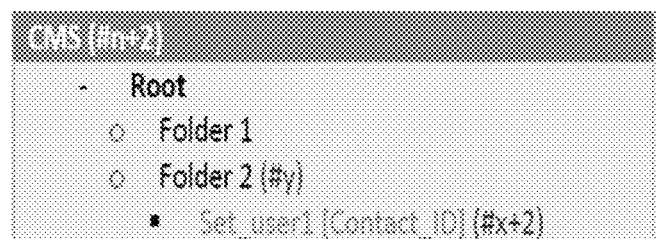

FIG. 12D shows the merged result when User1 opts to keep the resource previously published on the repository. As shown, the revision number for the merged container is incremented to account for the new publication and since Folder2 was deleted, it is not dirty and there is nothing to do on it. FIG. 12E shows the merged result when User1 opts to replace the repository's container with their changed resource, meaning the user wants to move "Set_user1 [Contact_ID]" to be under Folder 2. As shown, the revision number for the merged container is incremented to account for the new publication and the revision number for resource "Set_user1 [Contact_ID]" is also incremented to uniquely identify the newly published version thereof. Here, even if Folder 2 has been deleted remotely, it is still available in the local revision of User1 and the local copy of Folder 2 is put on the remote container with the same revision as the local copy (note: the revision should be incremented if Folder 2 is tagged as dirty locally).

Figure 13A:
FIGS. 13A-13E illustrate aspects of a conflict management process for editing a missing resource using a diff/merge strategy herein.
Figure 13B:
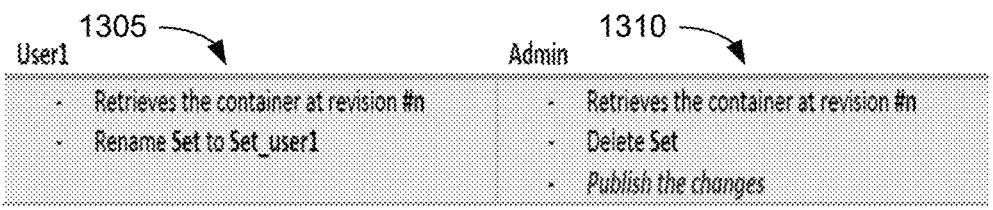
Figure 13C:
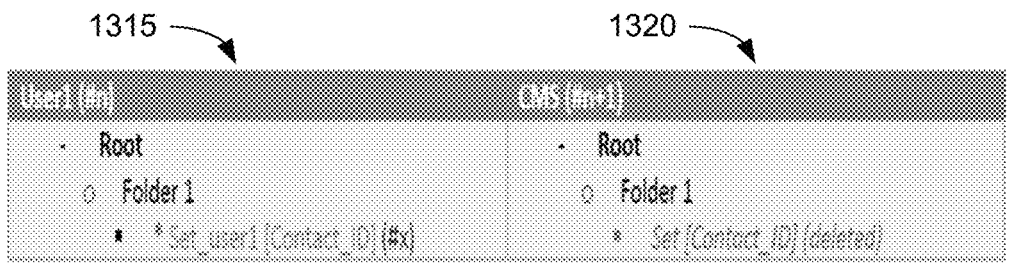

FIGS. 13A-13E illustrate aspects of a conflict management process for editing a missing resource using a diff/merge strategy herein. In this example use-case, FIG. 13A shows an initial state of a repository, including a container 1300 with an initial revision number of #n. FIG. 13B illustrates actions 1305 and 1310 performed simultaneously by User1 and Admin, respectively. The actions include user Admin deleting "Set". Based on the actions simultaneously performed by the users User1 and Admin, the resulting local resource is depicted at 1315 and the resulting resource on the repository due the Admin's actions are shown at 1320. The version number for modified local resource 1315 remains #n since it and the renamed "Set_user1 [Contact_ID]" has not yet been synced to the repository and "Set_user1 [Contact_ID]" is marked dirty as indicated by the "*". The revision number for container 1320 on the repository has been incremented since it has been published per the Admin's actions listed in FIG. 13B.

After the two users' simultaneous actions of FIG. 13B, User1 proceeds to publish his changes to the remote repository. However, a conflict is encountered on "Set_user1 [Contact_ID]". As shown, the revision number of the containers 1315 and 1320 are different and the local resource "Set_user1 [Contact_ID]" is deleted from the repository (i.e., deleted). Due to the conflict, User1 is prompted to indicate whether they want to keep the conflicted resource on the repository (i.e., discard their own changes) or replace the conflicted resource on the repository (i.e., keep their changes).

Figure 13D:
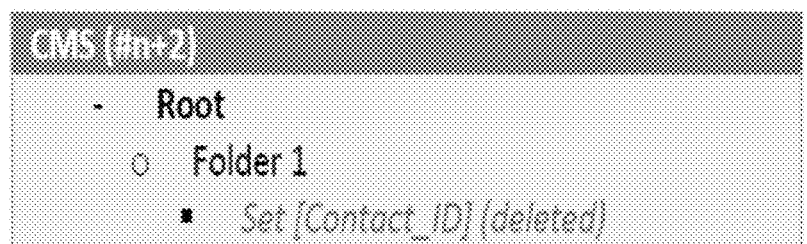
Figure 13E:
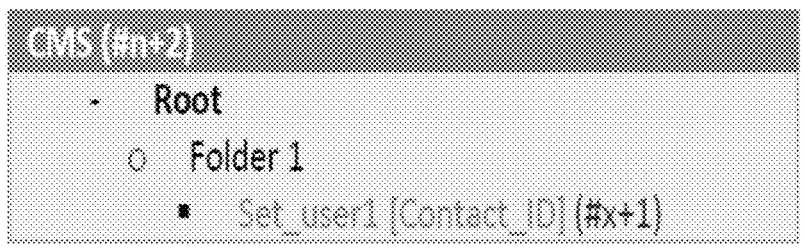

FIG. 13D shows the merged result when User1 opts to discard their local version and keep the resource previously published on the repository. As shown, the revision number for the merged container is incremented to account for the new publication and the Set will be kept as deleted. FIG. 13E shows the merged result when User1 opts to replace the repository's container with their changed resource, meaning the user wants to keep "Set_user1 [Contact_ID]". Here, even if "Set_user1 [Contact_ID]" has been deleted remotely, it is still present in the local copy and the local copy of "Set_user1 [Contact_ID]" is put on the remote container with an incremented revision.

Figure 14A:
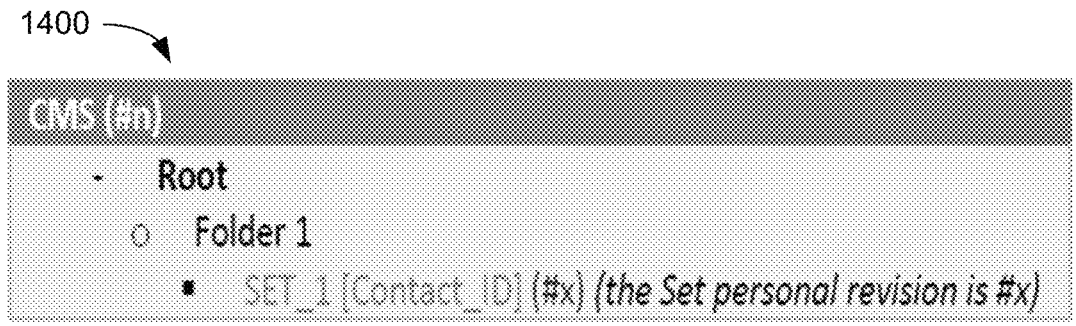
FIGS. 14A-14D illustrate aspects of a conflict management process for an instance of missing dependencies using a diff/merge strategy herein.
Figure 14B:
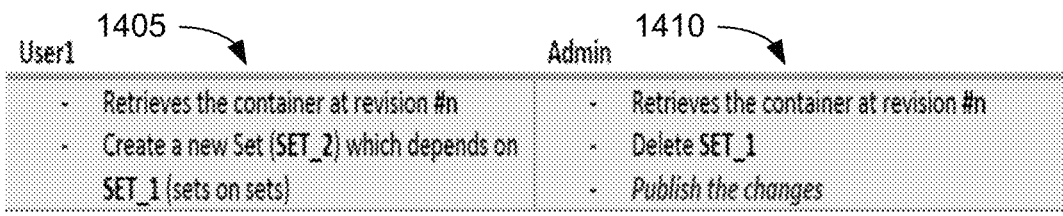
Figure 14C:
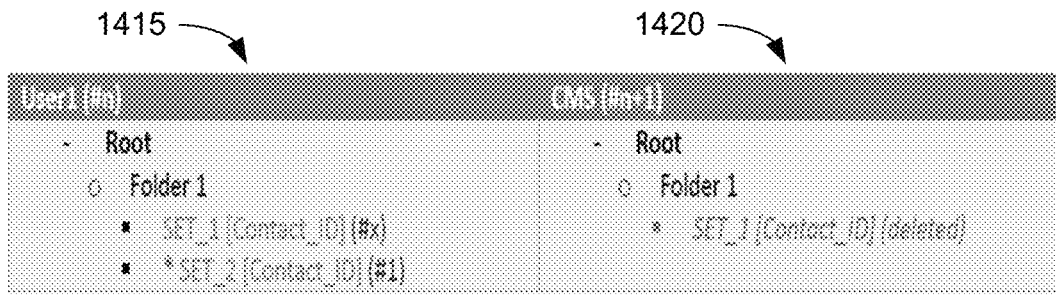
Figure 14D:
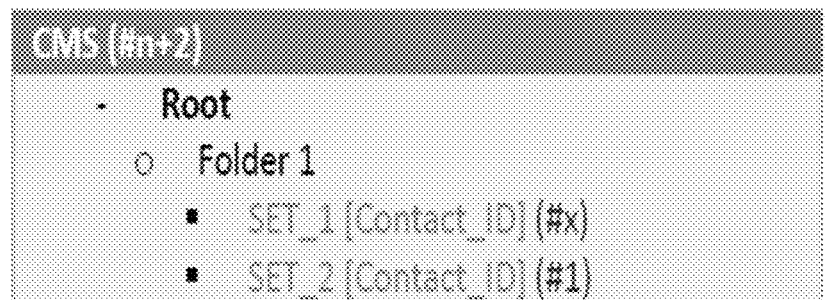

FIGS. 14A-14D illustrate aspects of a conflict management process for an instance of missing dependencies using a diff/merge strategy herein. In this example scenario, FIG. 14A shows an initial state of a repository, including a container 1400 with an initial revision number of #n. FIG. 14B illustrates actions 1405 and 1410 performed simultaneously by User1 and Admin, respectively. The actions include User1 creating a new set (i.e., "SET_2") that depends on "SET_1" and Admin deleting "SET_1" and publishing their changes. Based on the actions simultaneously performed by the users User1 and Admin, the resulting local resource is depicted at 1415 and the resulting resource published on the repository due the Admin's actions are shown at 1420. The version number for modified local resource 1415 remains #n since it has not yet been synced to the repository and "SET_2 [Contact_ID]" is marked dirty locally as indicated. Also, the revision number for container 1420 on the repository has been incremented since it has been published per the Admin's actions listed in FIG. 14B.

After the two users' simultaneous actions of FIG. 14B, User1 proceeds to publish his changes to the remote repository. In this example scenario there is no conflict. However, since User1 wants to publish "SET_2 [Contact_ID]" and it depends on "SET_1" (i.e., "SET_2" needs "SET_1" to exist), the existing local copy of "SET_1" must be copied back to the remote container to fulfill the dependency requirements of "SET_2". As shown, the revision number of the resulting container shown in 14D is incremented to account for the new publication.

In some embodiments, the consolidated, secure universe is generated dynamically when needed (i.e., in response to a query). The consolidated or merged universe including the original universe and the relevant set(s) may be stored separate and apart from original universe. The merged universe may be implemented as an in-memory copy, decoupled from the original universe. In some aspects, the sets may be viewed as "filters".

In some embodiments, the conflict handling or processing disclosed herein in the discussion of, for example, FIGS. 11-14, may be captured in the process 500 in FIG. 5, wherein the determination of whether a conflict exists on a particular resource is considered in operation 525. Accordingly, process 500 may further consider and represent the determination and further resolution of conflicts in concurrent authoring in some aspects of the present disclosure.

Figure 15:
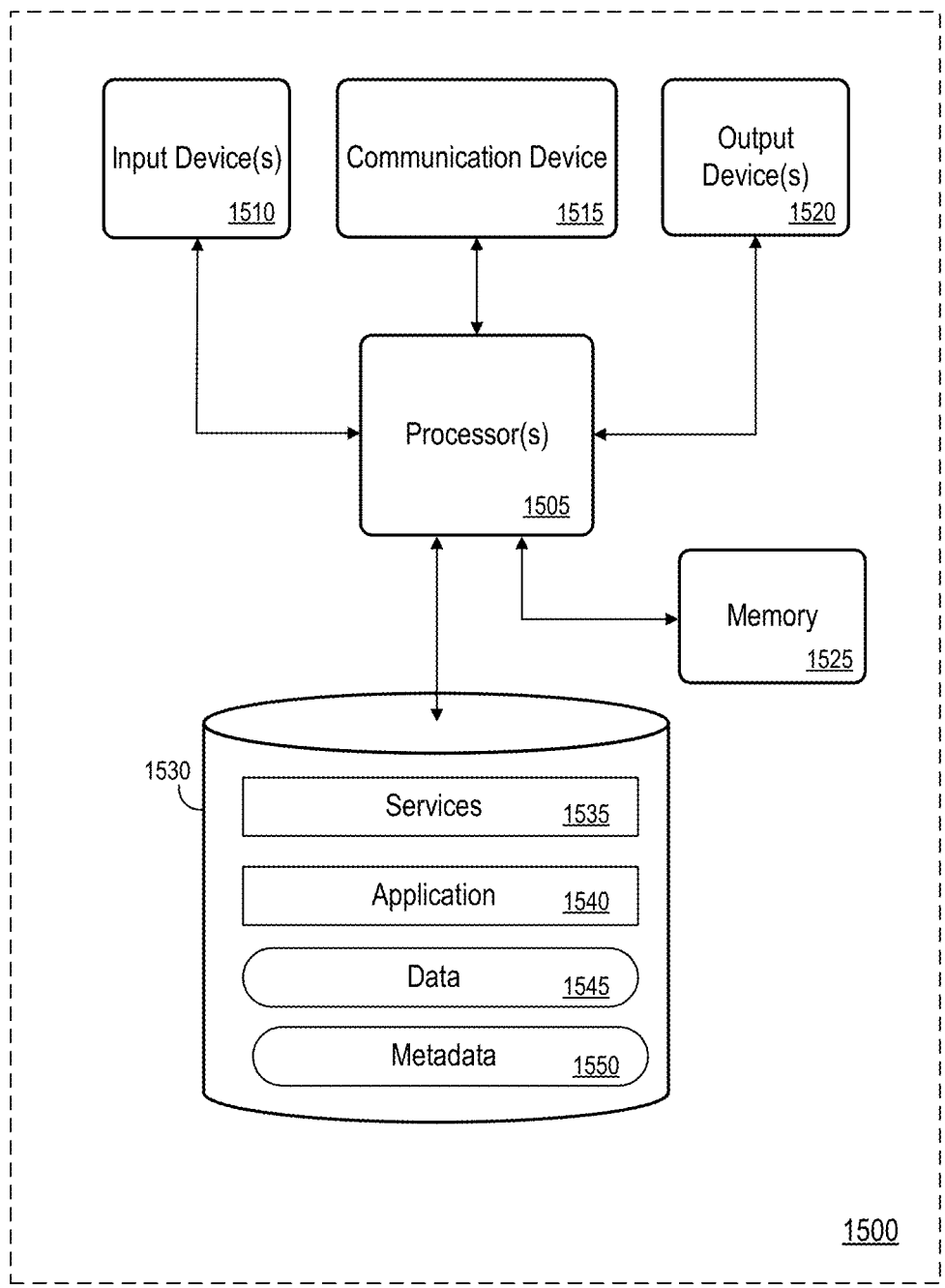
FIG. 15 is a block diagram of an apparatus, according to some embodiments.

FIG. 15 is a block diagram of apparatus 1500 according to some embodiments. Apparatus 1500 may comprise a computing apparatus and may execute program code to perform any of the functions described herein. Apparatus 1500 may comprise an implementation of server supporting an application (e.g., 110), a semantic layer 125, and a data store of FIG. 1 in some embodiments. Apparatus 1500 may include other unshown elements according to some embodiments.

Apparatus 1500 includes processor 1505 operatively coupled to communication device 1520, data storage device 1530, one or more input devices 1510, one or more output devices 1520 and memory 1525. Communication device 1515 may facilitate communication with external devices, such as a reporting client, or a data storage device. Input device(s) 1510 may comprise, for example, a keyboard, a keypad, a mouse or other pointing device, a microphone, knob or a switch, an infra-red (IR) port, a docking station, and/or a touch screen. Input device(s) 1510 may be used, for example, to enter information into apparatus 1500. Output device(s) 1520 may comprise, for example, a display (e.g., a display screen) a speaker, and/or a printer.

Data storage device 1530 may comprise any appropriate persistent storage device, including combinations of magnetic storage devices (e.g., magnetic tape, hard disk drives and flash memory), optical storage devices, Read Only Memory (ROM) devices, etc., while memory 1525 may comprise Random Access Memory (RAM), Storage Class Memory (SCM) or any other fast-access memory.

Services 1535 and application 1540 may comprise program code executed by processor 1505 to cause apparatus 1500 to perform any one or more of the processes described herein (e.g., process 500 of FIG. 5 and the merging operations related to FIGS. 11-14). Embodiments are not limited to execution of these processes by a single apparatus.

Data 1545 and metadata 1550 (either cached or a full database) may be stored in volatile memory such as memory 1525. Metadata 1550 may include information regarding fields, attributes, and methods of objects comprising a semantic layer. Data storage device 1530 may also store data and other program code and instructions for providing additional functionality and/or which are necessary for operation of apparatus 1500, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable instructions; and
a processor to execute the processor-executable instructions to cause the system to:
publish a semantic layer universe to expose objects of the universe, the semantic layer universe including objects mapped to source data stored in a repository that is separate and distinct from the semantic layer universe and each of the objects being a semantic layer entity representative of a data structure having fields and attributes defined by metadata associated with the objects;
publish at least one set container to the universe, the at least one set container being a data structure hosting at least one set, the at least one set being a semantic entity being defined by at least one of the fields and attributes defined by metadata associated with the objects, and the at least one set container and the at least one set hosted thereby being linked to each other by a repository relationship defining an association between the at least one set container and the at least one set;
receive a request to publish a new version of a set container to the universe stored on the repository from a first user;
determine whether a revision number of the new version of the set container from the first user is the same as a revision number for a version of the set container previously published to the universe stored on the repository;
in an instance the revision number of the new version of the set container from the first user is the same as a revision number for a version of the set container previously published to the universe stored on the repository, increment a revision number of specific local resources changed in the new version of the set container from the first user, publish the new version of the set container from the first user to the universe stored on the repository, and increment the revision number of the newly published set container in the universe stored on the repository; and
in an instance the revision number of the new version of the set container from the first user is different than a revision number for a version of the set container previously published to the universe stored on the repository, proceed to:
determine, for each local resource in the new version of the set container from the first user, a status of the local resource relative to a corresponding resource of the universe stored on the repository; and
merge each local resource in the new version of the set container from the first user on the universe based on the determined status for the respective local resource, the merging including incrementing a revision number of each local resource based on the determined status of each respective local resource and incrementing the revision number for the version of the set container previously published on the repository based on a difference between the revision number of the new version of the set container from the first user and the revision number for the version of the set container previously published to the universe stored on the repository.

2. The system of claim 1, wherein the status of the local resource relative to a corresponding resource of the universe is one of unchanged, new, deleted, modified locally, and modified both locally and remotely.

3. The system of claim 1, wherein a resource subject to authoring in the universe uniquely self-identifies components of its contents.

4. The system of claim 3, wherein the resource subject to authoring uniquely self-identifies components of its contents by generating a value string representative of each the components comprising its content.

5. The system of claim 4, wherein the at least one set in the at least one set container can be uniquely identified by a string including a combination of value strings representative of each component comprising resources of the set.

6. The system of claim 1, wherein the determining, for each local resource in the new version of the set container from the first user, the status of the local resource relative to a corresponding resource of the universe includes determining whether a conflict exists on each local resource relative to the universe.

7. A computer-implemented method, the method comprising:
publishing a semantic layer universe to expose objects of the universe, the semantic layer universe including objects mapped to source data stored in a repository that is separate and distinct from the semantic layer universe and each of the objects being a semantic layer entity representative of a data structure having fields and attributes defined by metadata associated with the objects;
publishing at least one set container to the universe, the at least one set container being a data structure hosting at least one set, the at least one set being a semantic entity being defined by at least one of the fields and attributes defined by metadata associated with the objects, and the at least one set container and the at least one set hosted thereby being linked to each other by a repository relationship defining an association between the at least one set container and the at least one set;
receiving a request to publish a new version of a set container to the universe stored on the repository from a first user;
determining whether a revision number of the new version of the set container from the first user is the same as a revision number for a version of the set container previously published to the universe stored on the repository;
in an instance the revision number of the new version of the set container from the first user is the same as a revision number for a version of the set container previously published to the universe stored on the repository, incrementing a revision number of specific local resources changed in the new version of the set container from the first user, publishing the new version of the set container from the first user to the universe stored on the repository and increment the revision number of the newly published set container in the universe stored on the repository; and
in an instance the revision number of the new version of the set container from the first user is different than a revision number for a version of the set container previously published to the universe stored on the repository:
determining, for each local resource in the new version of the set container from the first user, a status of the local resource relative to a corresponding resource of the universe; and
merging each local resource in the new version of the set container from the first user on the universe based on the determined status for the respective local resource, the merging including incrementing a revision number of each local resource based on the determined status of each respective local resource and incrementing the revision number for the version of the set container previously published on the repository based on a difference between the revision number of the new version of the set container from the first user and the revision number for the version of the set container previously published to the universe stored on the repository.

8. The method of claim 7, wherein the status of the local resource relative to a corresponding resource of the universe is one of unchanged, new, deleted, modified locally, and modified both locally and remotely.

9. The method of claim 7, wherein a resource subject to authoring in the universe uniquely self-identifies components of its contents.

10. The method of claim 9, wherein the resource subject to authoring uniquely self-identifies components of its contents by generating a value string representative of each the components comprising its content.

11. The method of claim 10, wherein the at least one set in the at least one set container can be uniquely identified by a string including a combination of value strings representative of each component comprising resources of the set.

12. The method of claim 7, wherein the determining, for each local resource in the new version of the set container from the first user, the status of the local resource relative to a corresponding resource of the universe includes determining whether a conflict exists on each local resource relative to the universe.

13. A non-transitory computer readable medium having executable instructions stored therein, the medium comprising:
instructions to publish a semantic layer universe to expose objects of the universe, the semantic layer universe including objects mapped to source data stored in a repository that is separate and distinct from the semantic layer universe and each of the objects being a semantic layer entity representative of a data structure having fields and attributes defined by metadata associated with the objects;
instructions to publish at least one set container to the universe, the at least one set container being a data structure hosting at least one set and the at least one set being a semantic entity being defined by at least one of the fields and attributes defined by metadata associated with the objects, and the at least one set container and the at least one set hosted thereby being linked to each other by a repository relationship defining an association between the at least one set container and the at least one set;

instructions to receive a request to publish a new version of a set container to the universe stored on the repository from a first user;

instructions to determine whether a revision number of the new version of the set container from the first user is the same as a revision number for a version of the set container previously published to the universe stored on the repository;

in an instance the revision number of the new version of the set container from the first user is the same as a revision number for a version of the set container previously published to the universe stored on the repository, instructions to increment a revision number of specific local resources changed in the new version of the set container from the first user, instructions to publish the new version of the set container from the first user to the universe stored on the repository, and increment the revision number of the newly published set container in the universe stored on the repository; and in an instance the revision number of the new version of the set container from the first user is different than a revision number for a version of the set container previously published to the universe stored on the repository, instructions to:

determine, for each local resource in the new version of the set container from the first user, a status of the local resource relative to a corresponding resource of the universe; and merge each local resource in the new version of the set container from the first user on the universe based on the determined status for the respective local resource, the merging including incrementing the revision number of each local resource based on the determined status of each respective local resource and incrementing the revision number for a version of the set container previously published on the repository based on a difference between the revision number of the new version of the set container from the first user and the revision number for the version of the set container previously published to the universe stored on the repository.

14. The medium of claim 13, wherein the status of the local resource relative to a corresponding resource of the universe is one of unchanged, new, deleted, modified locally, and modified both locally and remotely.

15. The medium of claim 13, wherein a resource subject to authoring in the universe uniquely self-identifies components of its contents.

16. The medium of claim 15, wherein the resource subject to authoring uniquely self-identifies components of its contents by generating a value string representative of each the components comprising its content.

17. The medium of claim 16, wherein the at least one set in the at least one set container can be uniquely identified by a string including a combination of value strings representative of each component comprising resources of the set.

18. The medium of claim 13, wherein the determining, for each local resource in the new version of the set container from the first user, the status of the local resource relative to a corresponding resource of the universe includes determining whether a conflict exists on each local resource relative to the universe.

\* \* \* \* \*